(12) United States Patent
Dagn

(10) Patent No.: US 6,234,350 B1
(45) Date of Patent: May 22, 2001

(54) DEVICE FOR REMOVING A LIQUID FROM A CLOSED CAVITY

(76) Inventor: Josef Dagn, Schwendter Str. 231a, A-6345 Kossen Tirol (AT)

( * ) Notice: Subject to any disclaimer, the term of this patent is extended or adjusted under 35 U.S.C. 154(b) by 0 days.

(21) Appl. No.: 09/311,396

(22) Filed: May 13, 1999

(30) Foreign Application Priority Data

May 14, 1998 (DE) .......................................... 298 08 756 U

(51) Int. Cl.[7] .................................................... B67D 5/00
(52) U.S. Cl. ........................... 222/83.5; 222/87; 141/329
(58) Field of Search .................................... 141/329, 330, 141/51; 222/81, 82, 83.5, 87; 137/318

(56) References Cited

U.S. PATENT DOCUMENTS

| | | | |
|---|---|---|---|
| 3,751,786 | * 8/1973 | Lyon ................................. | 29/402.01 |
| 4,046,013 | * 9/1977 | Green ................................. | 137/318 |
| 4,564,138 | * 1/1986 | Bethel et al. ........................ | 141/329 |
| 4,626,142 | * 12/1986 | Brin et al. ........................... | 137/318 |
| 5,163,483 | * 11/1992 | Eckman ............................... | 222/81 |
| 5,186,219 | * 2/1993 | Gold et al. .......................... | 141/51 |
| 5,427,157 | * 6/1995 | Nickens et al. ..................... | 141/330 |
| 5,546,979 | * 8/1996 | Clark, II et al. .................... | 137/318 |
| 5,704,383 | * 1/1998 | Kammeraad et al. ............... | 137/318 |
| 6,070,762 | * 6/2000 | Klann ................................. | 222/83.5 |

* cited by examiner

Primary Examiner—J. Casimer Jacyna
(74) Attorney, Agent, or Firm—Schnader Harrison Segal & Lewis LLP

(57) ABSTRACT

A device for removing liquid from a closed cavity, such as from a shock absorber of a motor vehicle, is proposed; the device compresses a drill, which is guided displaceably in a guide housing, a preloading device at one end of the guide housing for displacing the drill in the guide housing, an intermediate piece at the other end of the guide housing, the intermediate piece having a central bore for the drill bit to pass through and at least one fluid connection on the outer circumference for the removal of liquid, and compressing a gripping device, which is fitted to the device and fixes the latter to the wall of the cavity to be emptied.

8 Claims, 2 Drawing Sheets

DEVICE FOR REMOVING A LIQUID FROM A CLOSED CAVITY

BACKGROUND

1. Field of the Invention

The invention relates to a device for removing liquid from a closed cavity, such as from a shock absorber, a spring strut of a vehicle or the like.

2. Description of the Related Art

When old vehicles are being disposed of, it is necessary to remove not only petrol and coolant from the vehicle before it is scrapped, but also liquids from closed cavities which are not readily accessible, such as from shock absorbers, spring struts and the like.

SUMMARY OF THE INVENTION

The invention is based on the object of proposing an appliance by means of which liquids can be removed rapidly and simply from closed cavities, in order then to be disposed of.

According to the invention, this object is essentially achieved with a device as claimed in claim 1. The appliance can be attached to a shock absorber or spring strut, after which the liquid can be removed largely automatically via a suction device which is connected.

BRIEF DESCRIPTION OF THE DRAWINGS

The invention will be explained in more detail by way of example with reference to the drawing, in which.

DETAILED DESCRIPTION

Figure 1:
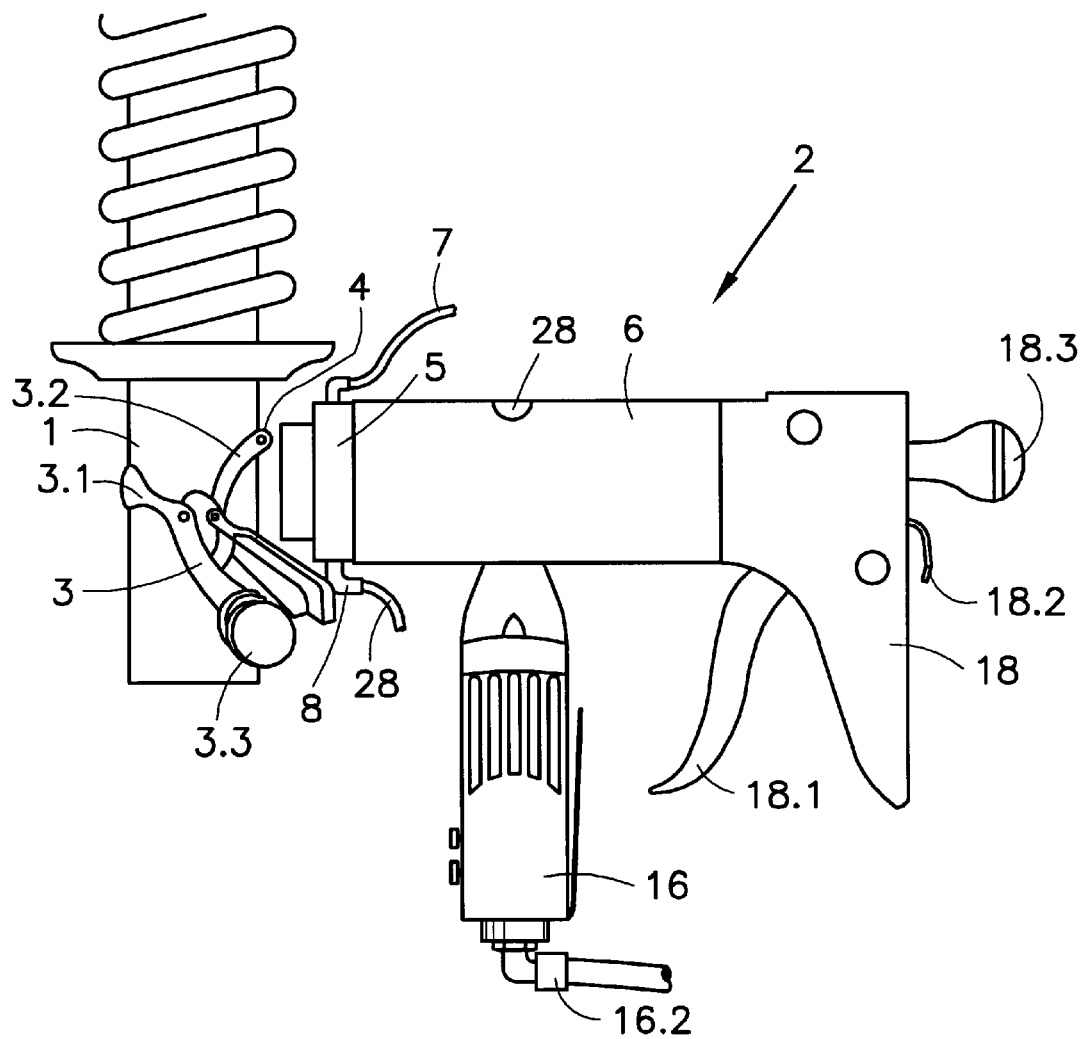
FIG. 1 is a side view of the appliance attached to a shock absorber.

In FIG. 1, reference numeral 1 designates a spring strut or a shock absorber, which is filled with a hydraulic oil which is to be removed from the shock absorber. Reference number 2 designates, in general terms, a device for removing the liquid from the shock absorber, said device being designed as a hand-held appliance and having various units.

Reference numeral 3 designates gripping tongs having gripping jaws 3.1 and 3.2, which can be fixed in the gripping position and fix the device 2 to the shock absorber 1. The shape of the gripping jaws 3.1 and 3.2 is reproduced in FIG. 2. The gripping jaw 3.2 is of U-shaped design and, at both ends, has holes 4 which are used to accommodate articulation pins. By means of the gripping jaw 3.2, the tongs 3 are articulated at 4 to the circumference of an intermediate piece 5, the U-shaped gripping jaw 3.2 engaging around the approximately cylindrical intermediate piece 5, to which the articulation pins are fitted. The opposite gripping jaw 3.1 is approximately arc-shaped and comes to rest on the circumference of the cylindrical shock absorber 1, as FIG. 1 shows. Reproduced at 3.3 is an adjusting screw, by means of which the tongs 3 can be adjusted to different diameters of a shock absorber 1.

Figure 2:
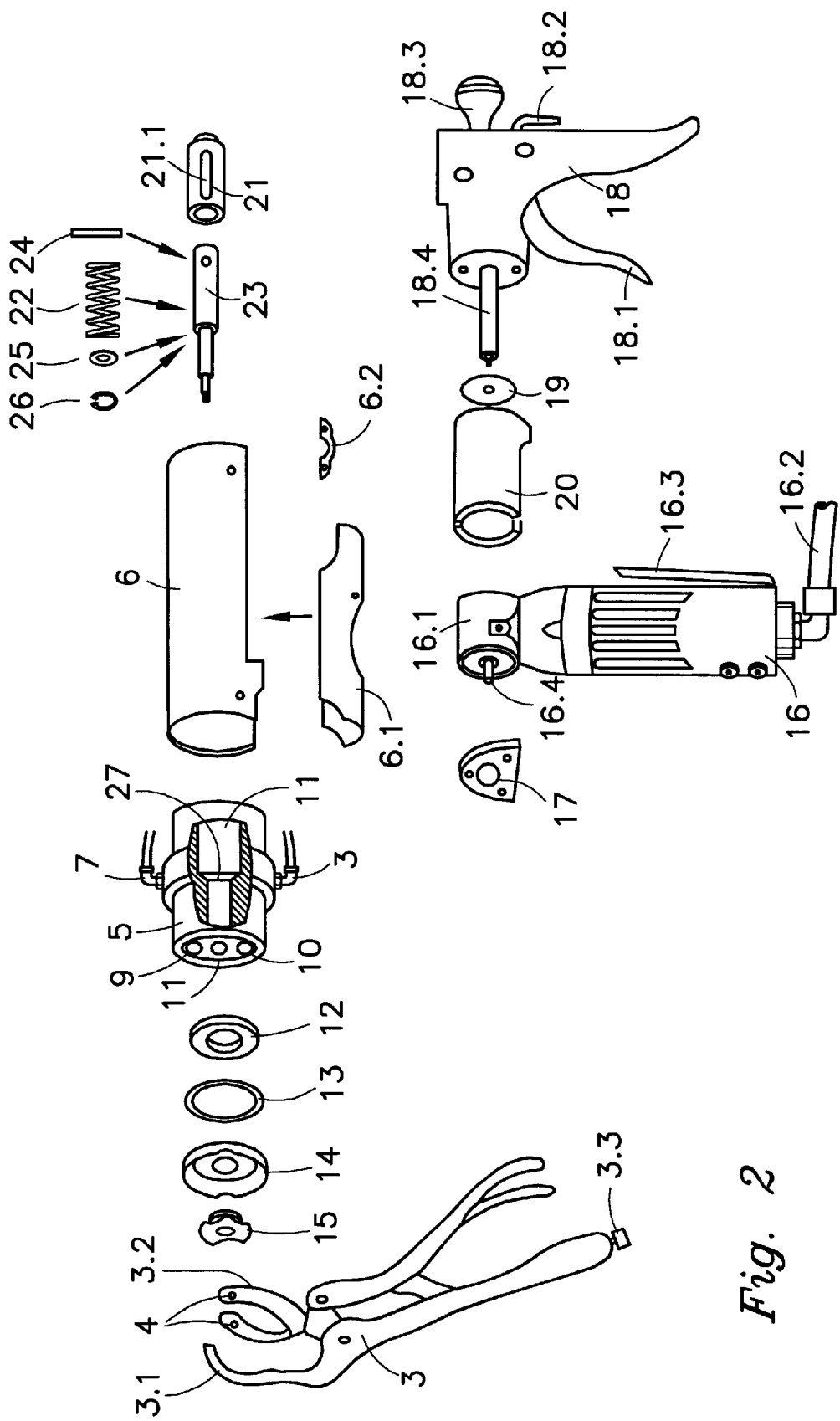
FIG. 2 is an exploded view of a device according to the invention.

As FIG. 2 shows, the intermediate piece 5 fitted to a guide housing 6 of the device 2 is provided with a continuous central bore 11 and, on the external circumference, with diametrically opposite fluid connections 7 and 8, which are connected to ducts which run separately in the intermediate piece and open at its end in openings 9 and 10. Provided on the end of the intermediate piece 5 is a magnetic ring 12, which facilitates attachment to the shock absorber 1. 13 is a sealing ring between the magnetic ring 12 and a holding plate 14 for a contact-pressure rubber 15, which comes to rest on the circumference of the shock absorber 1 and seals off the hole which is to be made on the circumference.

The tubular guide housing 6, which is cut open at the bottom, has a lower part 6.1 with a radial opening, through which a drill 16 is inserted, the latter being provided with a drill head 16.1 which is located at right angles thereto and which is aligned with the cylindrical intermediate piece 5. In the exemplary embodiment illustrated the drill 16 is driven by means of compressed air, which is fed at 16.2. 16.3 designates a lever for operating the drill.

Provided on the side of the guide housing 6 opposite the intermediate piece 5 is a preloading device 18 in the form of a thrust gun having a thrust lever 18.1, a pull-back lever 18.2 and a pull-back knob 18.3, by means of which a plunger 18.4 can be extended and locked in the extended position. 19 designates a contact pressure plate, which is fastened to the plunger 18.4 and acts on a piston 20, which is designed approximately as a partially longitudinally slotted tube and engages over the drill head 16.1 of the drill 16. The piston 20 is guided in the guide housing 6 and moves the drill 16 in the drilling direction, provision being made for a fastening plate 17, which is fastened to the end of the piston 20, so that the drill head 16.1 of the drill 16 is held in the piston 20 between the plates 17 and 19.

A threaded spindle 16.4, which is driven by the drill, projects from the end of the drill head 16.1. A tubular driver 21 with an internal thread is screwed onto this threaded spindle 16.4. On the circumference, the driver 21 has a longitudinal slot 21.1, which accommodates a pin 24 which is inserted into a radial bore in a drill spindle 23, which is guided in the driver 21 so that it is displaceable in the direction of the longitudinal axis. Arranged on the drill spindle 23 is a compression spring 22, which is supported on a washer 25 held on the drill spindle 23 by means of a circlip 26. The opposite end of the spring 22 is supported on the end of the driver 21. 6.2 designates a spacer as a part of the housing 6; the thrust gun 18 rests on said spacer and is held in the guide housing 6.

The appliance operates as follows. Firstly, by means of the tongs 3, the appliance is attached to the shock absorber 1 and locked. By pressing the appliance on by means of the tongs 3, the rubber seal 15 with the holding plate 14 is pressed against the shock absorber to be emptied. At 4, the tongs 3 are articulated on the intermediate piece 5 by means of the articulation pins or by means of dowel screws in such a way that the pivoting range and the accommodation range of the tongs can easily be changed. After the appliance 2 has been fixed to the shock absorber 1, the level 18.1 on the thrust gun 18 is operated, as a result of which the drill head 16.1 of the drill 16 is pushed forward by the piston 20. While the drill 16 is already operating, the drill spindle 23 is pushed back counter to the force of the spring 22 by a pumping movement by means of the lever 18.1, the spring 22 being compressed. In the process, the drill spindle 23 is displaced in the driver 21, the driver pin 24 being guided in the longitudinal guide 21.1 in the driver. As a result of this prestressing, the drilling operation can be carried out automatically and without any manual contact force. After the hole has been made in the circumference of the shock absorber 1, the pull-back lever 18.2 is operated and therefore the locking in the preloading device 18 is released, at which point the drill spindle 23 is pressed automatically back into the starting position by the still effective force of the spring 22.

A sealing ring is provided at 27 in the central bore 11 in the intermediate piece 5, and sealed off on the drill head 16.1 or a preceding plate, such as the fastening plate 17, so that the liquid emerging from the hole which has been made can be sucked off via the fluid connection 8, to which a suction device with a collecting container (not illustrated) is connected.

Since a closed space is formed by the sealing ring 27 in the intermediate piece 5 and the seal at 15 on the circumference of the shock absorber 1, from which space hydraulic oil can be sucked out of the shock absorber 1 by a vacuum pump, a vacuum is produced in this cavity. In order to dissipate this vacuum, which prevents further suction, after the suction device has been shut off, compressed air is introduced briefly at 7, after which the suction can be continued via the connection 8. In this case, a changeover is made periodically between the connections 7 and 8 until the cavity in the shock absorber 1 has been completely emptied.

The suction line indicated at 28 in FIG. 1 is at least partly of transparent design, so that it is possible to see from outside whether the shock absorber 1 has already been completely emptied or not.

A swarf filter is preferably fitted in the fluid connection 8, in order that the swarf produced in the drilling operation does not get into the vacuum pump. It is also possible to provide a filter in the region of the holding plate 14, it being possible for this filter to be cleaned easily by means of a locking pin which can be latched in.

Various modifications of the device described above are possible. Thus, for example, the magnetic ring 12 can also be omitted, and the gripping device in the form of the tongs 3 can also be designed in another way, for example in the form of a clamp which is placed around the shock absorber 1.

At 28 in FIG. 1, a radial opening is made in the guide housing 6, through which opening a drill change on the drill spindle 23 can be performed.

Instead of the separate ducts with the mouth openings 9 and 10 in the intermediate piece 5 for the connections 7 and 8, the latter may also be connected directly to the central bore 11, so that suction is carried out via the front portion of the central bore 11 in the intermediate piece 5, and compressed air is also periodically introduced via this portion.

According to a modified embodiment, the gripping tongs 3 may be fastened by means of the U-shaped gripping jaw 3.2 to a ring (not illustrated), which is mounted so that it can rotate on the intermediate piece 5. In this way, the tongs 3 can be rotated relative to the device 2 into a suitable fastening position.

A manually operated valve, by means of which the drill 16 can be set operating and switched off again, can be provided on the compressed-air feed 16.2 of the drill 16 (FIG. 1).

A manually operated valve, by means of which the above-described vacuum equalization can be performed, is expediently provided in the suction line 28 (FIG. 1). The suction line 28 having this interposed valve is connected to a suction unit (not illustrated), into which the oil is sucked from the cavity to be emptied in the shock absorber 1.

What is claimed is:

1. A device for removing liquid from a closed cavity, comprising:

a drill guided displaceably in a guide housing, a preloading device at one end of the guide housing, comprising a plunger driven by a thrust gun for displacing the drill in the guide housing, an intermediate piece at the other end of the guide housing, the intermediate piece having a central bore for a drill bit to pass through, and having at least one fluid connection on an outer circumference for removing liquid, and a gripping device fitted to the device for removably affixing the device to a wall of the cavity to be emptied.

2. The device as claimed in claim 1, wherein the drill is provided with a drill spindle which is displaceable in the axial direction and is based in the drilling direction by a spring.

3. The device as claimed in claim 2, wherein a driver is screwed onto a threaded spindle of the drill head of the drill, in which driver the drill spindle is guided in the axial direction under the action of a spring.

4. The device as claimed in claim 1, wherein the drill head of the drill is held in a hollow piston which can be displaced by the preloading device, the piston being guided displaceably in the guide housing.

5. The device as claimed in claim 1, wherein the gripping device comprises gripping tongs, which are adjustably fitted at one gripping jaw to the intermediate piece and, at the other gripping jaw, to engage around the cavity to be emptied.

6. The device as claimed in claim 1, wherein at least one sealing ring is fitted to the end of the intermediate piece to seal off the wall of the cavity to be emptied.

7. The device as claimed in claim 1, wherein a sealing ring is provided in the central bore in the intermediate piece to seal the intermediate piece from the drill.

8. The device as claimed in claim 1, wherein a connection is provided on the intermediate piece to feed compressed air to or to vent the internal space, to which a vacuum is applied via the connection, between the intermediate piece and the wall of the cavity to be emptied, this internal space being sealed off by a seal on the intermediate piece and being pressed by the gripping device against the wall of the cavity to be emptied.

* * * * *